US012610271B2

(12) United States Patent　(10) Patent No.:　US 12,610,271 B2
Pateromichelakis　(45) Date of Patent:　Apr. 21, 2026

---

(54) POLICY MODIFICATION IN A TSN SYSTEM

(71) Applicant: Lenovo (Singapore) Pte. Ltd., New Tech Park (SG)

(72) Inventor: Emmanouil Pateromichelakis, Viersen (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 564 days.

(21) Appl. No.: 18/015,379

(22) PCT Filed: Jul. 10, 2020

(86) PCT No.: PCT/EP2020/069651
§ 371 (c)(1),
(2) Date: Jan. 10, 2023

(87) PCT Pub. No.: WO2022/008086
PCT Pub. Date: Jan. 13, 2022

(65) Prior Publication Data
US 2023/0284077 A1　　Sep. 7, 2023

(51) Int. Cl.
*H04W 28/02*　　　(2009.01)
*H04L 47/20*　　　(2022.01)
(Continued)

(52) U.S. Cl.
CPC ......... *H04W 28/0268* (2013.01); *H04L 47/20* (2013.01); *H04L 47/2416* (2013.01); *H04L 47/28* (2013.01)

(58) Field of Classification Search
CPC ............... H04W 28/0268; H04L 47/20; H04L 47/2416; H04L 47/28; H04L 47/283
See application file for complete search history.

(56) References Cited

U.S. PATENT DOCUMENTS

| | | | |
|---|---|---|---|
| 2021/0204172 A1* | 7/2021 | Rost | ...................... H04L 43/026 |
| 2021/0273890 A1* | 9/2021 | Ayaz | ..................... H04L 47/283 |

FOREIGN PATENT DOCUMENTS

| | | |
|---|---|---|
| WO | 2019214810 A1 | 11/2019 |
| WO | 2020035130 A1 | 2/2020 |
| WO | 2020067966 A1 | 4/2020 |

OTHER PUBLICATIONS

3GPP, "3rd Generation Partnership Project; Technical Specification Group Services and System Aspects; Study on application layer support for Factories of the Future in 5G network (Release 17)", 3GPP TR 23.745 V0.8.0 (Year: 2020).*

(Continued)

*Primary Examiner* — Ayaz R Sheikh
*Assistant Examiner* — David Zhijun Sun
(74) *Attorney, Agent, or Firm* — Kunzler Needham & Hilton

(57) ABSTRACT

Apparatuses, methods, and systems are disclosed for providing subscription data for an external subscriber. One apparatus includes a processor and a network interface that receives a registration request message from a remote unit and receives a subscription retrieval information. Here, the registration request message contains an external subscriber identifier and the subscription retrieval information is different than the external subscriber identifier of the remote unit. The processor controls the network interface to transmit to a network function in a mobile communication network a first request for subscription data retrieval using the subscription retrieval information and receive a response message from the network function that contains the UE subscription data. Here, the subscription retrieval information indicates that the subscription data is stored in a subscription owner outside the mobile communication network.

20 Claims, 9 Drawing Sheets

(51) Int. Cl.
  H04L 47/2416    (2022.01)
  H04L 47/28    (2022.01)

(56) References Cited

OTHER PUBLICATIONS

Huawei, HiSilicon, "QOS Negotiation between 3GPP and TSN networks KI#3.1", S2-188233, SA WG2 Meeting #128Bis, Aug. 20-24, 2018, Sophia Antipolis, France. (Year: 2018).*

PCT/EP2020/069651, "Notification of Transmittal of the International Search Report and the Written Opinion of the International Searching Authority, or the Declaration", International Searching Authority, Mar. 30, 2021, pp. 1-15.

3GPP, "3rd Generation Partnership Project; Technical Specification Group Services and System Aspects; Study on application layer support for Factories of the Future in 5G network; (Release 17)", 3GPP TR 23.745 V0.8.0, May 2020, pp. 1-36.

3GPP, "3rd Generation Partnership Project; Technical Specification Group Services and System Aspects; Service requirements for cyber-physical control applications in vertical domains; Stage 1 (Release 17)", 3GPP TS 22.104 V17.2.0, Dec. 2019, pp. 1-76.

3GPP, "3rd Generation Partnership Project; Technical Specification Group Services and System Aspects; Service requirements for the 5G system; Stage 1 (Release 17)", 3GPP TS 22.261 V17.3.0, Jul. 2020, pp. 1-83.

3GPP, "3rd Generation Partnership Project; Technical Specification Group Services and System Aspects; Service Enabler Architecture Layer for Verticals (SEAL); Functional architecture and information flows; (Release 16)", 3GPP TS 23.434 V16.3.0, Mar. 2020, pp. 1-120.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Policy and charging control framework for the 5G System (5GS); Stage 2 (Release 16)", 3GPP TS 23.503 V16.4.1, Apr. 2020, pp. 1-115.

3GPP, "3rd Generation Partnership Project; Technical Specification Group Core Network and Terminals; Service Enabler Architecture Layer for Verticals (SEAL); Application Programming Interface (API) specification; Stage 3 (Release 16)", 3GPP TS 29.549 V1.2.0, Apr. 2020, pp. 1-76.

* cited by examiner

300

500

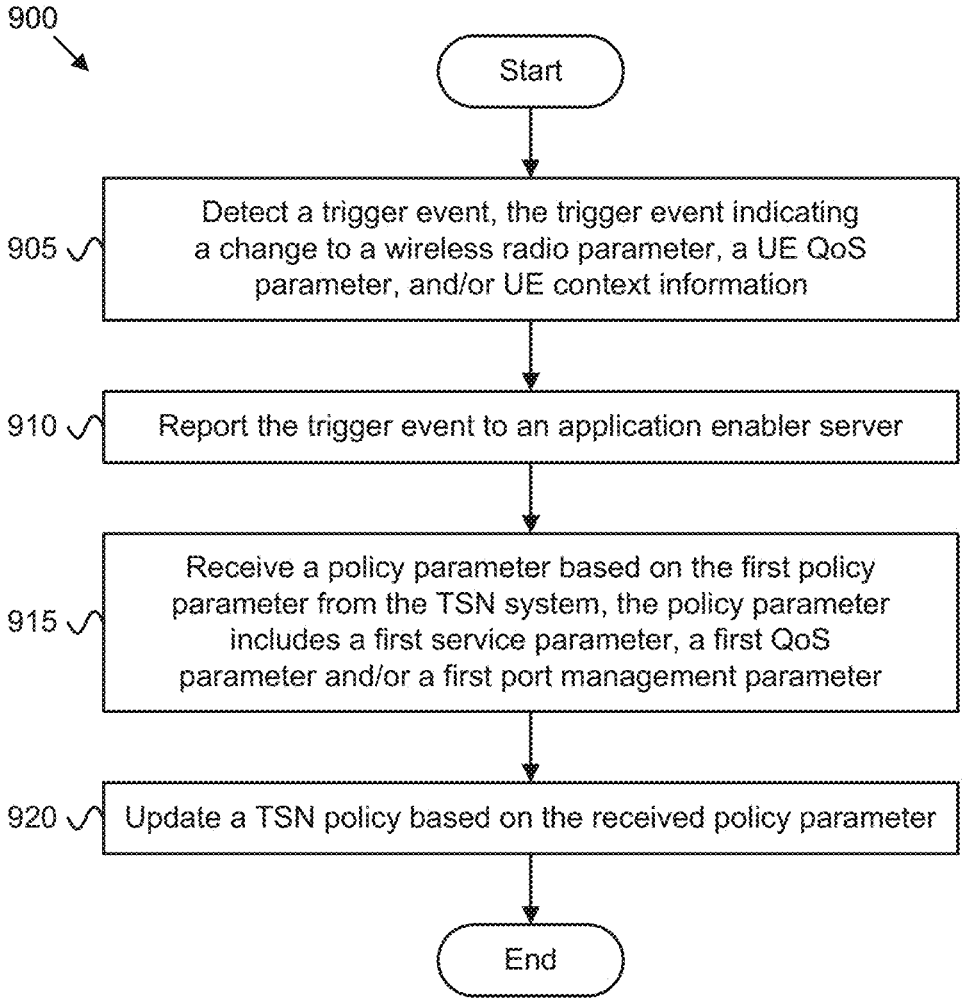

900

Start

905 — Detect a trigger event, the trigger event indicating a change to a wireless radio parameter, a UE QoS parameter, and/or UE context information 910 — Report the trigger event to an application enabler server 915 — Receive a policy parameter based on the first policy parameter from the TSN system, the policy parameter includes a first service parameter, a first QoS parameter and/or a first port management parameter 920 — Update a TSN policy based on the received policy parameter End

FIG. 9

POLICY MODIFICATION IN A TSN SYSTEM

FIELD

The subject matter disclosed herein relates generally to wireless communications and more particularly relates to middleware-assisted TSN traffic and QoS requirements negotiation.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Fifth Generation QoS Identifiers ("5QI"), Fifth Generation QoS Class Identifier ("5Qis"), Authentication, Authorization and Accounting ("AAA"), Access and Mobility Management Function ("AMF"), Access Stratum ("AS"), Positive-Acknowledgment ("ACK"), Application Function ("AF"), Application Programming Interface ("API"), Automated Guided Vehicle ("AGV"), Base Station ("BS"), Category of Requirements ("CoR"), Centralized Network Channel State Information ("CSI"), Configuration ("CNC"), Control Element ("CE"), Cooperating merging ("CM"), Cooperative Overtaking ("CO"), Cooperating Transition of Control ("CToC"), Core Network ("CN"), Downlink ("DL"), Discontinuous Transmission ("DTX"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), Factory of the Future ("FF"), FF Application Client ("FFAC"), FF Application Enabler Client ("FFAE-C"), FF Application Enabler Server ("FFAE-S"), General Packet Radio Service ("GPRS"), Generic Public Service Identifier ("GPSI"), Global System for Mobile Communications ("GSM"), Hybrid Automatic Repeat Request ("HARQ"), Home Subscriber Server ("HSS"), Information Element ("IE"), Internet-of-Things ("IoT"), International Electrotechnical Commission ("IEC"), International Mobile Equipment Identity ("IMEI"), Key Performance Indicator ("KPI"), Level of Automation ("LoA"), Long Term Evolution ("LTE"), Mobility Management ("MM"), Mobility Management Entity ("MME"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Resource 'x' ("NRx"), Network Slice Selection Assistance Information ("NSSAI"), Packet Data Unit ("PDU", used in connection with 'PDU Session'), Packet Error Rate ("PER"), PC5 5QI ("PQI"), Permanent Equipment Identifier ("PEI"), Per-Stream Filtering and Policing ("PSFP"), Policy Control Function ("PCF"), Policy and Charging Control ("PCC"), Proximity Service ("ProSe"), Public Land Mobile Network ("PLMN"), Quality of Service ("QoS"), Quality of Experience ("QoE"), Radio Access Network ("RAN"), Radio Link Management ("RLM"), Radio Resource Management ("RRM"), Receive ("Rx"), Road Side Unit ("RSU"), Round Trip Time ("RTT"), Service Enabler Architecture Layer ("SEAL"), Session Management ("SM"), Session Management Function ("SMF"), Service Provider ("SP"), Single Network Slice Selection Assistance Information ("S-NSSAI"), Transport Block ("TB"), Time Sensitive Communications ("TSC"), TSC Assistance Information ("TAI"), Time Sensitive Networking ("TSN"), TSN Application Server ("TSN AS"), Device-Side TSN Translator ("DS-TT"), Network-Side TSN Translator ("NW-TT"), Tracking Area ("TA"), Transmit ("Tx"), Vehicle-to-Everything ("V2X"), Vehicle-to-Infrastructure ("V2I"), Vehicle-to-Vehicle ("V2V"), Vehicle-to-Relay ("V2R"), V2X Application Enabler ("VAE"), Unified Data Management ("UDM"), User Data Repository ("UDR"), User Entity/Equipment (Mobile Terminal) ("UE"), Uplink ("UL"), User Plane ("UP"), User Plane Function ("UPF"), Universal Mobile Telecommunications System ("UMTS"), UMTS Terrestrial Radio Access ("UTRA"), UMTS Terrestrial Radio Access Network ("UTRAN"), User Service Description ("USD"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

IEEE TSN is a set of standards to define mechanisms for the time-sensitive (i.e., deterministic) transmission of data over Ethernet networks. The 5G System is extended to support Time sensitive communication as defined in IEEE P802.1Qcc.

BRIEF SUMMARY

Disclosed are procedures for policy modification in a TSN system. One method of a server, e.g., for negotiating the TSN QoS, service and bridge parameters for one or more TSC flows of one or more UEs, includes receiving a trigger event, the trigger event indicating a change to at least one of: a wireless radio parameter, a UE QoS parameter, and UE context information. The method includes determining a first policy parameter for at least one UE and requesting a policy modification from a TSN system, said request including the first policy parameter. Here, the first policy parameter comprising at least one of: a first service parameter, a first QoS parameter and a first port management parameter. The method includes receiving a second policy parameter based on the first policy parameter from the TSN system and transmitting the second policy parameter to at least one network entity and/or the at least one UE.

One method of a UE, e.g., for negotiating the TSN QoS, service and bridge parameters for one or more TSC flows of one or more UEs in an operation phase, includes detecting a trigger event, the trigger event indicating a change to at least one of: a wireless radio parameter, a UE QoS parameter, and UE context information. The method includes reporting the trigger event to an application enabler server and receiving a policy parameter based on the first policy parameter from the TSN system, the policy parameter comprising at least one of: a first service parameter, a first QoS parameter and a first port management parameter. The method includes updating a TSN policy based on the received policy parameter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a flowchart diagram illustrating one embodiment of another method that may be used for policy modification in a TSN system.

DETAILED DESCRIPTION

Figure 1:
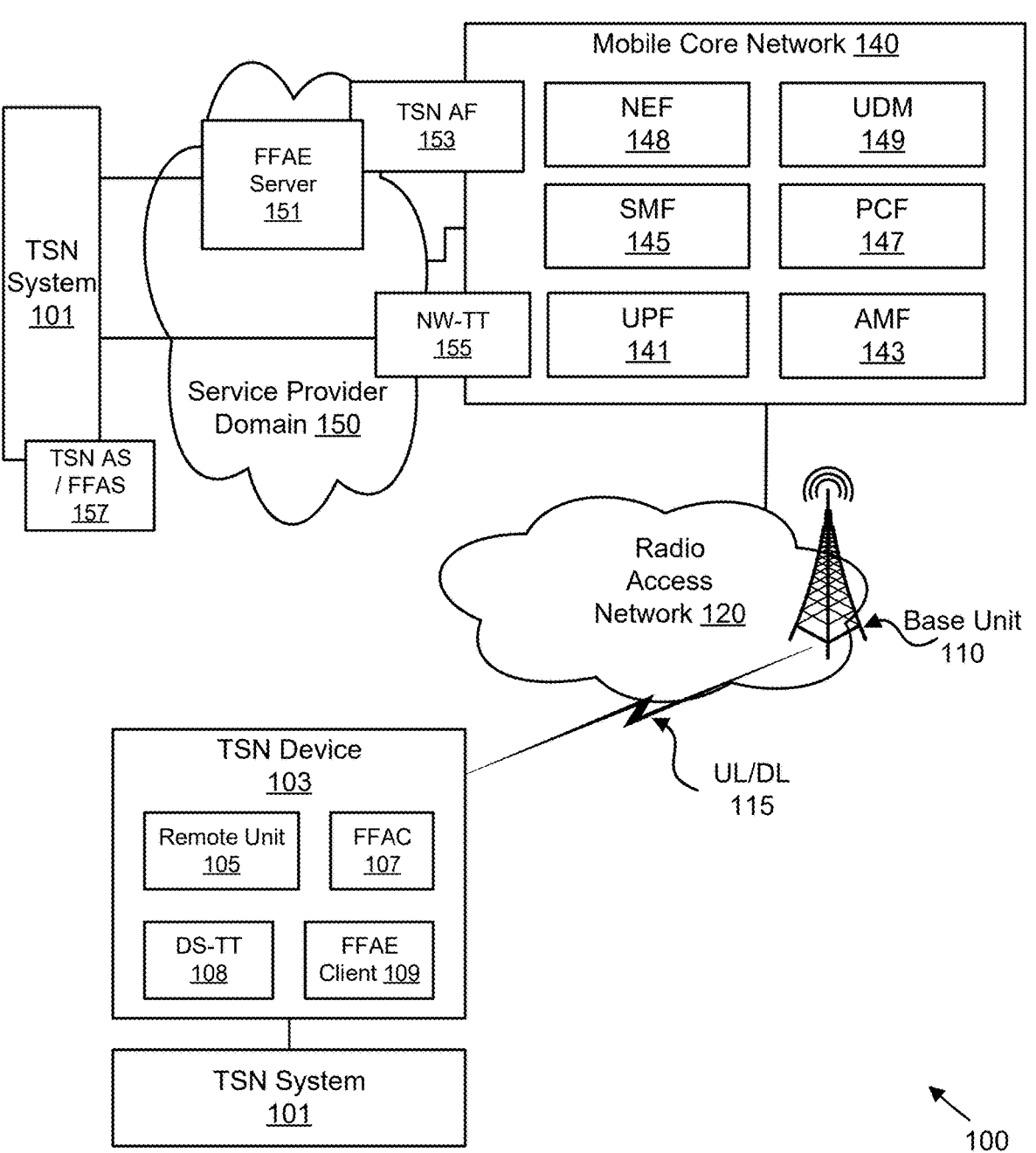
FIG. 1 is a schematic block diagram illustrating one embodiment of a wireless communication system for policy modification in a TSN system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof"

includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for supporting the monitoring of application TSN QoS parameters and negotiating a change of an application parameter related to the TSN service operation and/or performance (in particular a change of a user equipment QoS parameter, a radio parameter, a user equipment context) to be mapped to an updated traffic policy and/or network policy and/or QoS policy by an external (i.e., 3rd-party) application, such as an application enabler server and client, e.g., for Factory-of-the Future. Negotiating a change of wireless radio and/or user equipment QoS/context parameter to be mapped to an updated policy may take the form of 1) adaptation of service requirements (e.g., survival time), 2) adaptation of network requirements (e.g., TSN QoS) or 3) adaptation of port management policies (DS-TT, NW-TT policies)

The high-level problem to be solved by this disclosure is how to dynamically translate and negotiate the change of one or more application parameters related to the TSN service operation and/or performance, to network QoS and traffic policies to ensure meeting the TSC requirements, subject to changes at the wireless network conditions and/or UE context.

Time-Sensitive Networking (TSN) is a key functionality of industrial networks in factories of the future. Such industrial networks are usually ethernet-based IEEE 802.1-based networks. 5G could provide advantages for cyber-physical control applications with respect to flexibility and mobility due to their radio access network with low latency, high availability, high reliability, and time synchronization capabilities over wireless links. On the other hand, IEEE-802.1-based TSN networks provide advantages with wired connectivity for cyber-physical control applications, especially for demanding real-time control applications and periodic-deterministic communication, also with very high availability requirements. 5G together with IEEE 802.1-based TSN networks, can provide a holistic solution for use cases in factories of the future. Thus, an integration of 5G networks and IEEE 802.1-based TSN networks may be necessary.

TSN was developed to enable deterministic communication on standard Ethernet. Deterministic communication is important to multiple industries (for example, aerospace, automotive, manufacturing, transportation, and utilities). "Deterministic" in this context means that such flows provide guaranteed bandwidth, bounded latency, and other properties germane to the transport of time-sensitive data. TSN was developed to provide a way to make sure information can travel from point A to point B in a fixed and predictable amount of time. Being predictable enables increased efficiency.

When integrating 5G networks and IEEE 802.1-based TSN networks, one key challenge is how to translate the TSN traffic policies to application QoS parameters (as identified in 3GPP TS 22.104); and subsequently application QoS parameters to network QoS parameters (e.g., 5QIs) to meet the overall objective of guaranteeing meeting the tight deterministic Time Sensitive Communications ("TSC") service Key Performance Indicators ("KPIs"). More specifically in TS 23.501 the following procedure is supported for periodic deterministic traffic:

At step 1, the TSN traffic pattern policies are set by the TSN system, using Per-Stream Filtering and Policing (PSFP) policies. PSFP is used to filter frames at the ingress port that do not meet the configured policies. Different types of policies may apply as in IEEE 802.1Q, such as: A) Time-based policing: This allows detection of incoming frames during periods when the stream gate is in the closed state; B) Rate-based policing: This is supported by the flow meter instances; and C) Burst-based policing: This is supported by the flow meter instances, indicating the length of supported burst (back-to back sending of streams).

At step 2, the TSN AF is responsible for obtaining PSFP parameters and use them to calculate traffic pattern parameters (such as burst arrival time with reference to the ingress port, periodicity, and flow direction)

At the step 3, the TSN AF is also responsible of forwarding these parameters in TSN QoS container to the SMF (via PCF). At the step 4, the SMF will bind PCC rules with a TSN QoS Container, e.g., as described in clause 6.1.3.2.4 of TS 23.503. At the step 5, the SMF derives TSCAI on a per QoS Flow basis and send it to the RAN.

For some parameters defined in 3GPP TS 22.104, e.g., survival time, the mapping of application QoS to network QoS parameters (steps 2 and 3 above) is not straightforward. Also, how the TSN AF selects the mapping of traffic to QoS at 5GS is left to implementation. Furthermore, there are use cases (e.g., mobile robots), where due to the mobility requirement, some negotiation of the parameters may be needed between the TSN system and the 5GS so as to prevent service discontinuity.

The proper integration of 5G networks and TSN networks can also require the acquisition and configuration of service requirements that may not be yet in the scope of the current 5G QoS framework. In particular:

Survival time (e.g., as specified in 3GPP TS 22.104) which reflects an application's resilience to consecutive transmission failures of the application data. The survival time which is seen as an application QoS attribute (i.e., service performance requirement, as specified in TS 22.104), should be taken into account when the TSN system provides/adapts the service requirements to the 5GC or the UE, since this may have impact on the network QoS configuration. The survival time indicates to the communication service the time available to recover from failure. This parameter is thus tightly related to maintainability.

Transfer interval target value (for periodic deterministic traffic): time difference between two consecutive transfers of application data from an application via the service interface to 3GPP system. This definition is based on subclause 3.1.85 in IEC 62657-2.

TSC service area: geographic region where a 3GPP communication service is accessible. For some services can be in Length×Width×Height format.

UE speed and/or mobility: UEs may be stationary or mobile (e.g., mobile robots). The UE speed requirements are shown in TS 22.104. The speed requirement may be adjustable (up to a maximum threshold) and it may affect the network QoS parameter setting.

The rationale behind investigating this topic is the fact that when integrating with 5GS, due to the nature of the wireless part of the 5GS (RAN, wireless BH), some impact on the fulfilment of the deterministic communication requirements (due to the fluctuations of performance of the wireless access) may be seen; hence the wireless access could be seen as the bottleneck when using 5GS as a bridge.

However, the 5G System specific procedures in 5GC and RAN, wireless communication links, etc. remain hidden from the TSN network, and 5GS is seen as TSN Bridge. At the same time, the service communication parameters are closely coupled with the TSN service performance and need to be taken into account when configuring the QoS parameters.

To this end, the dynamic interaction between the 5GS operator and TSN system, for guaranteeing, by negotiating, the TSC service KPI (or application QoS parameters), subject to network/radio conditions changes, is needed to be discussed as part of the application layer on top of 5GS, to allow the translation of 5GS bridge parameters to TSN policies, while hiding the 5GS topology to TSN system.

The problem to be solved is how to enable the TSN system to dynamically interact with one or more underlying networks/5GS bridges for negotiating the change of one or more application parameters related to the TSN service operation and/or performance and their mapping to network QoS and traffic policy parameters.

IEEE TSN is a set of standards to define mechanisms for the time-sensitive (i.e., deterministic) transmission of data over Ethernet networks. The 5G System is extended to support Time sensitive communication as defined in IEEE P802.1Qcc.

3GPP TS 23.501 describes 5G System features that support Time Sensitive Communications (TSC) and allow the 5G System to be integrated transparently as a bridge in an IEEE TSN network. The 5G System is integrated with the external network as a TSN bridge. This "logical" TSN bridge includes TSN Translator functionality for interoperation between TSN System and 5G System both for user plane and control plane. 5GS TSN translator functionality consists of Device-side TSN translator (DS-TT) and Network-side TSN translator (NW-TT).

5G System specific procedures in 5GC and RAN, wireless communication links, etc. remain hidden from the TSN network. To achieve such transparency to the TSN network and the 5GS to appear as any other TSN Bridge, the 5GS provides TSN ingress and egress ports via DS-TT and NW-TT. DS-TT optionally supports link layer connectivity discovery and reporting as defined in IEEE 802.1AB for discovery of Ethernet devices attached to DS-TT. NW-TT supports link layer connectivity discovery and reporting as defined in IEEE 802.1AB for discovery of Ethernet devices attached to NW-TT.

5GS supports both periodic and aperiodic deterministic traffic. For periodic traffic, a periodic deterministic QoS feature (TS 23.501, clause 5.27.1a) allows the 5GS to support periodic deterministic communication where the traffic characteristics are known a-priori, and a schedule for transmission from the UE to a downstream node, or from the UPF to an upstream node is provided via external protocols outside the scope of 3GPP (e.g., IEEE TSN).

The features include the following: A) Providing TSC Assistance Information (TSCAI) that describe TSC flow traffic patterns at the 5GS egress interfaces; and B) Support for hold-and-forward buffering or stop-and-buffering mechanism in the TSN Translator on the UE side and UPF side to de-jitter flows that have traversed the 5G System. A "TSC flow," as used herein, describes the time-critical communication between end devices. Each flow has strict time requirements that the networking devices honor. Each TSN flow is uniquely identified by the network devices.

Application architecture aspects to support Factories of the Future in 5G network, and corresponding architectural solutions are specified in 3GPP TR 23.745. The study includes identifying architecture requirements that are necessary to ensure efficient use and deployment of application layer support for Factories of the Future in 5G network. As part of this study, one identified Key Issue is the one related to TSN Supporting (KI #4) which investigates the issue on how to enable the translation of TSN application QoS requirements (e.g., survival time) to network QoS parameters, and what would be the impact on 5GS for QoS enforcement.

To this end, a novel functionality is disclosed at a middleware layer (can be seen as application enabling function on top of the communication part) for negotiating the TSN QoS, service and bridge parameters for one or more TSC flows of one or more user equipment.

In various embodiments, the middleware layer supports the adaptation of service requirements for the TSC and/or the port management parameters for the 5GS bridge and the determination of policies, in order to cope with the QoS/radio related dynamic changes (e.g., congestion, QoS downgrade).

In various embodiments, the middleware layer supports the negotiation of the determined policies between a middleware functionality and the TSN system, without involving the 5GS (which is seen as a bridge).

In various embodiments, the middleware layer supports the interactions with the application enabler client at the Device side for monitoring TSC QoS and/or service-related parameters and configuring the application of the device with new policies to be dynamically applied.

FIG. 1 depicts a wireless communication system 100 for policy modification in a TSN system, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with a communication host (e.g., application server) via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server using the PDU session. Note that the remote unit 105 may establish one or more PDU sessions (or other data connections) with the mobile core network 140. As such, the remote unit 105 may concurrently have multiple active PDU session with may be for the same or different packet data networks. In various embodiments, the remote unit 105 establishes a PDU session with a TSN application server in the service provider domain 150 for TSC service.

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network slice instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

The service provider domain 150 includes network-side functions of the TSN system 101. In some embodiments, the TSN AS 157 is application specific server which may reside at the TSN System 101. In certain embodiments, the TSN AS 157 may be a FF application specific server that interacts with the FF Application Client ("FFAC") 107.

As depicted, the wireless communication system 100 may include an FF Application Enabler Server ("FFAE-S") 151, a TSN AF 153, and a NW-TT 155. In some embodiments, the FFAE-S 151 includes the TSN AF 153. In other embodiments, the TSN AF may be part of the mobile core network 140. The TSN AF 153 refers to the AF which interacts with the 5G core and may interact with e.g., the PCF 147 and/or NEF 148.

In some embodiments, the TSN AF 153 is part of the mobile core network 140. In other embodiments, the TSN AF 153 may be part of service provider domain 150. Similarly, the NW-TT 155 may be a part of the mobile core network 140 or a part of the service provider domain. The NW-TT 155 provides the user plane interactions between UPF 141 and the TSN system 101, whereas the TSN AF 153 handles the control plane interactions between control plane of the mobile core network 140 and the TSN system 101.

While FIG. 1 depicts components of a 5G RAN and a 5G core network, the described embodiments for policy modification in a TSN system apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

TSN device 103 includes a remote unit 105, an FF Application Client ("FFAC") 107, a Device-Side TSN Translator ("DS-TT") 108, and an FF Application Enabler Client ("FFAE-C") 109. The TSN device 103 uses the RAN 120 and mobile core network 140 to connect to the network elements of the TSN system 101.

In various embodiments, the FFAC 107 interacts with a FF application specific server (e.g., the TSN AS 157) for TSN service operation. The DS-TT 108 has a network-side counterpart, the NW-TT 155, and provides TSN Translator functionality at the TSN device 103 for interoperation between TSN System 101 and 5G System (i.e., RAN 120 and mobile core network 140) for the user plane.

The FF Application Enabler Client ("FFAE-C") 109 is at a FF middleware layer (i.e., an application-enabling function), which monitors the application TSN QoS parameters and negotiates the service and/or QoS requirements (and/or port management policies) for adapting the TSN service operation. The FFAE-C 109 interacts with a FFAE-S 151. In certain embodiments, the FFAE-C(s) 109 and FFAE-S 151 form a distributed TSN middleware.

In the following descriptions, the term gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting FF bridging.

Figure 2:
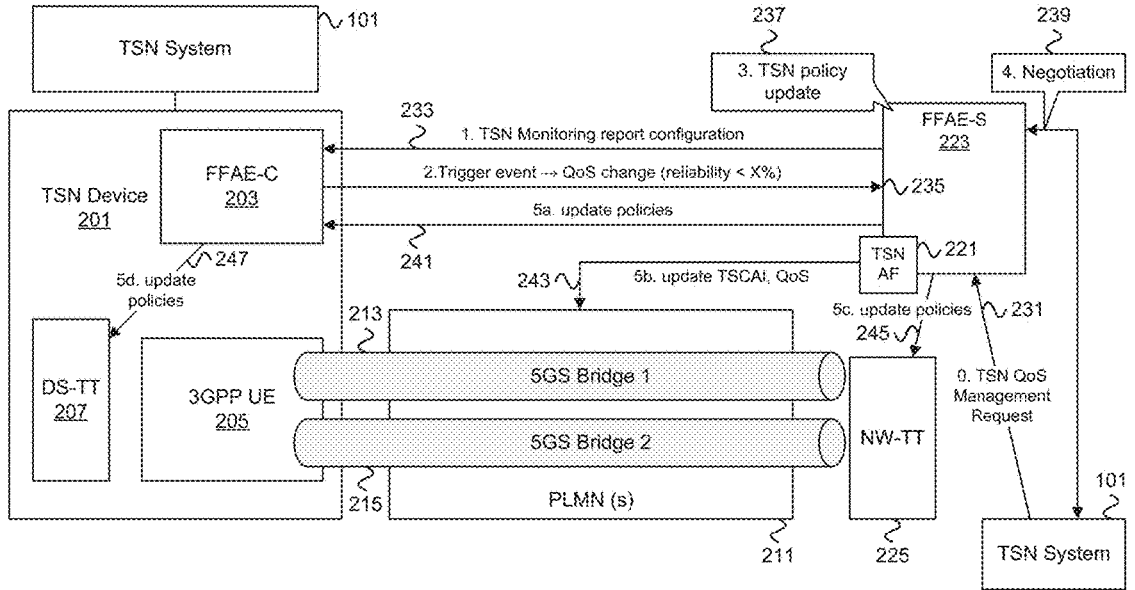
FIG. 2 is a diagram illustrating one embodiment of a network architecture of a configuration phase for policy modification in a TSN system.

FIG. 2 depicts a network architecture 200 for policy modification in a TSN system, according embodiments of the disclosure. The network architecture 200 includes a TSN system 101 including a TSN device 201, at least one PLMN 211, a NW-TT 225, a FFAE-S 223 and TSN AF 221. Note here that the TSN device 201 includes a FFAE-C 203, a DS-TT 207 and a 3GPP UE 205. Additionally, the 3GPP UE 205 allows the TSN device 201 to communicate with a TSN/FF application-specific server via a first 5GS bridge 213 and/or a second 5GC bridge 215 supported by the PLMN(s) 211. Note that the TSN AF 221 may be part of the 5GS bridge too (e.g., the TSN AF 221 handles the control plane interactions with 5G Core in PLMN(s) 211).

Disclosed herein is a mechanism for (e.g., the FFAE server 223 and FFAE client 203) for monitoring the application TSN QoS parameters and negotiating a change of application QoS requirements to be mapped to an updated traffic policy and/or network policy, which may take the form of 1) adaptation of service requirements (e.g., survival time), 2) adaptation of network requirements (e.g., TSN QoS) or 3) adaptation of port management policies (DS-TT policies, NW-TT policies). The solution comprises the following high level steps:

At step 0, the TSN/FF application-specific server (or another external functionality from the TSN system 101, e.g., CNC) sends to the FFAE-S 223 a request for managing the TSN QoS for one or more applications (see messaging 231). For TSN, the CNC acts as a proxy for the Network (the TSN Bridges and their interconnections) and the control applications that require deterministic communication. The CNC defines the schedule on which all TSN frames are transmitted.

The FFAE-S 223 is defined as a middleware server which may reside at the service providers domain or the network operator domain; and includes TSN AF functionality 221 as well as server-client support functionalities. TSN system 101 distributes the TSN QoS requirements, PSFP policies and TSN scheduling parameters to FFAE-S 223, as part of the request.

At step 1, in response of the receiving the request, the FFAE-S 223 configures one or more FFAE-Cs 203 (using also pre-configured traffic mapping tables by OAM), to monitor application or network related TSN QoS attributes and report trigger events based on their unfulfillment (see messaging 233). This trigger may also be related to the degradation of the radio conditions. The FFAE-C 203 in response of receiving the configuration, may send a response/ACK to the FFAE-S 223 and starts monitoring the radio conditions (by interacting with the AS layers of the UE).

At step 2, the TSN device 201 experiences a trigger event. The FFAE-C 203 captures a change at the radio access conditions and/or UE context (e.g., mobility/velocity) and reports to the FFAE-S 223 a trigger event based on the changes, e.g., the change of application or network QoS for the session (see messaging 235).

At step 3, the FFAE-S 223 in response of receiving the trigger event, translates the change of network/application QoS conditions to an updated proposed TSN policy, to ensure meeting the stringent KPIs (see block 237). This proposed updated policy is one or more of the following: 1) Update of TSN service attributes (survival time, mobility, TSC service area, automation level); 2) Update of TSN QoS attributes (e.g., requirement for new 5QI for the session); 3) Update of port management policies (for NW-TT 225 and/or DS-TT 207), e.g., including also a) Change the relationship between a port on UE/DS-TT side and a PDU Session, and b) Change of hold and buffer parameters to allow the dynamic de-jittering for a session.

At step 4, the FFAE-S 223 negotiates the proposed updated policies with the TSN System 101 and/or the CNC, by sending a request to the TSN system 101 (i.e., TSN AS or CNC), to adjust the service/QoS/port management requirements (see messaging 239).

At steps 5, the FFAE-S in response of receiving a confirmation of the TSN system (acknowledgement or an alternative for policy update), it applies the new policies accordingly. Depending on the new policy, this is communicated to one or more of the following: (A) transmit the new service requirements to the FFAE-C 203 and 5GS (see messaging 241 and 243), (B) transmit the new QoS policies to 5GS (e.g., PLMN 211; see messaging 243), (C) transmit to the NW-TT 225 the updated policies, and in particular, to transfer standardized and deployment-specific port management information (acting as TSN AF 221; see messaging 245), and (D) transmit to the DS-TT 207 (via the FFAE-C

203) the updated policies, and in particular, to transfer standardized and deployment-specific port management information between the FFAE-S 223 and the FFAE-C 203 to reach DS-TT 207 (see messaging 247).

The benefit of applying the policies related to service requirements are to allow the fast adaptation of application behavior (e.g., mobility, survival time) to ensure meeting the TSC flow requirements, whereas preventing the adaption of the network QoS parameters.

As particular example of application-to-network QoS negotiation, the survival time which is set per TSN service can be provided. This metric may be adjusted to avoid service discontinuity (if packets are not received after X ms, session is suspended; however, this may be due to some temporary link degradation). If the FFAE-C 203 monitors some congestion at radio side and alerts the FFAE-S 223, then the FFAE-S 223 may request the adjustment of survival time in a given area. In another example, the mobility of the UEs/TSN Devices 201 may be reduced to allow for meeting the KPIs (e.g., in case of moving towards a congested area).

The benefit of applying the policies related to QoS requirements adaption are to ensure undisrupted service by dynamically negotiating the change of service offering for a TSC flow with the TSN system 101.

As a particular example, the FFAE-S 223 may request to adapt the TSN QoS profile so as to continue providing the service with more relaxed QoS attributes. The FFAE-S 223 provides the requested adaption to CNC and CNC may trigger the application requirements adaptation which result to QoS profile change (via TSCAI).

The benefit of applying port management policies corresponding to the user-plane and/or 5GS bridge adaptations are that the FFAE-S 223 may re-configure the NW-TT/DS-TT rules, e.g., to change the stop-and-buffer mechanisms to ensure meeting the deterministic communication requirements for the corresponding application. This may result—after negotiation—to change of the 5GS bridge 213, 215 if the current bridge cannot support the delay requirements.

One particular example for policy adaptation is that when high jitter is monitored, the parameters for hold-and-forward buffering (also referred to as stop-and-forward buffering) may be adapted (adapt the time for holding the traffic) to ensure meeting the jitter target for the user-plane traffic.

As a further example for policy adaptation corresponding to both port management policies and service requirements, when high jitter is monitored for an ongoing session, the hold-and-forward buffering parameters may be adapted to de-jitter the TSC flows. However, this will have impact on the survival time, because the delayed reception of the traffic (due to holding the incoming packets at the NW-TT 315) may lead to session termination at the device side (due to reaching the maximum survival time). In this case, the FFAE-S 323 negotiates with the TSN system (e.g., TSN AS and/or CNC 325) the adaption of the survival time, in combination with the hold-and-forward buffering parameters. After negotiating, the FFAE-S 323 provides the new survival time to the FFAE-C 303, and the new hold-and-forward buffering parameters to the NW-TT 315.

Figure 3:
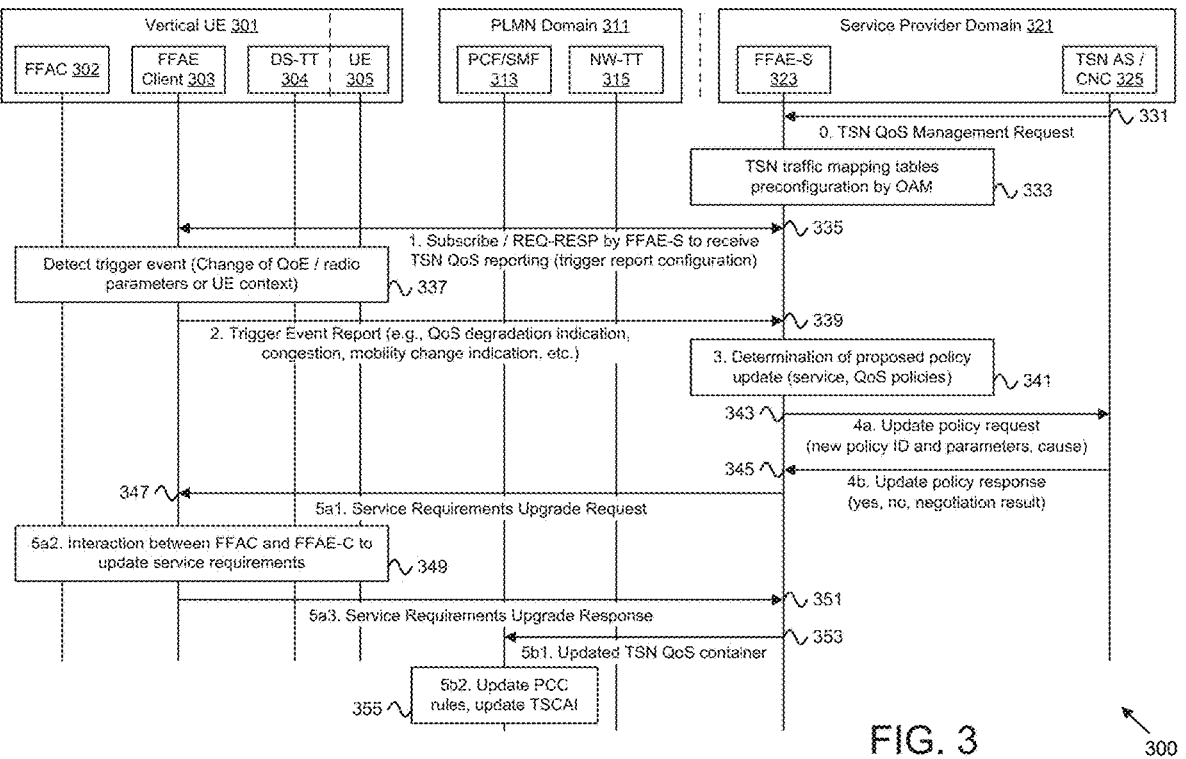
FIG. 3 is a diagram illustrating signaling flow for a configuration phase for policy modification in a TSN system.

FIG. 3 depicts a procedure 300 for negotiating the service and/or QoS requirements, according to embodiments of the disclosure. The procedure 300 involves a vertical UE 301, a PLMN domain 311, and a service provider domain 321. Here, the vertical UE 301 includes a FFAC 302, a FFAE client ("FFAE-C") 303, a DS-TT 304, and an 3GPP UE 305. The PLMN domain 311 includes a PCF and/or SMF (depicted as combined element "PCF/SMF" 313). The PLMN domain 311 also includes a NW-TT 315. The service provider domain 321 includes a FFAE server ("FFAE-S") 323 and TSN application server and/or CNC (depicted as combined element "TSN AS/CNC" 325).

The procedure 300 for negotiating the service requirements and/or QoS requirements between the FFAE-S and the TSN system for adapting the TSN service operation due to an access related event (radio related or UE context related change). As a precondition, the procedure 300 assumes that the UE 305 is registered to 5GS (e.g., part of PLMN domain 311).

At Step 0, the TSN system (e.g., TSN application specific server 325) sends to the FFAE-S 323 a request for managing the TSN QoS for one or more applications. The FFAE-S 323 is defined as a middleware server which may reside at the service providers domain 321 or the network operator domain (e.g., PLMN domain 311). The FFAE-S 323 may include TSN AF functionality as well as server-client support functionalities.

This request for managing the TSN QoS for one or more applications may include one or more of the following parameters: Application ID; service profile(s) and ID(s); service requirements (survival time, mobility, service coverage area); TSN QoS-related parameters; traffic classes and their priorities per port; TSC Burst Size of TSN streams; 5GS bridge delays per port pair and traffic class (independentDelayMax, independentDelayMin, dependentDelayMax, dependentDelayMin); propagation delay per port; UE-DS-TT residence time; PSFP policies; enforcement flag (whether the FFAE-S has the permission to enforce or just recommend a change); maximum number of UEs to be active simultaneously; UE IDs (GPSI, external ID, group ID); and area of validity (cell IDs, TA ID) and time of validity.

Note that the FFAE-S 323 may also have pre-configured mapping tables from OAM (e.g., as specified in TS 23.501).

At Step 1, the FFAE-S 323 interacts with the FFAE-C 303 to request the monitoring of radio status and/or UE context status (see messaging 335). This can be in the form of a Request-Response (one-time event or periodically) or by Subscribing-Notify when an event is triggered. The FFAE-S 323 may also configure the TSN QoS event reporting at the Subscribe and/or Request message.

In some embodiments, the request/subscription may include one or more of the following parameters: A) Application ID; B) Service profiles and service IDs; C) UE IDs; D) TSN QoS related parameters; E) TSN QoS report configuration (time, format, parameters Mandatory and Optional); and F) area and time of validity.

At Step 2, a trigger event is captured at the FFAE-C 303 (see block 337) by either the application layer of the UE 305 (e.g., QoE measurements, throughput degradation, packet drops, . . . ) or by the lower layers of the UE 305 (based on radio measurements like CSI, RRM, RLM measurements). Also, the application (i.e., FFAC 302) may provide UE-related context change (e.g., change of mobility or velocity) which will be input for the trigger.

A trigger event report message is sent from FFAE-C 303 to FFAE-S 323 (see messaging 339). In various embodiments, the trigger event report includes one or more of the following parameters: UE QoE/QoS downgrade indication; UE QoS/QoE sustainability analytics; High resource load indication and/or Congestion indication; High access delay indication; Low Resource availability indication; QoS fluctuations indication; Radio Link failures indication; Channel Loss over a X %; PER over Y %; UE mobility and/or velocity change indication; RRM/RLM measurements; Indication for reaching maximum survival time; and Indication for reaching service area edge At Step 3, the FFAE-S 323 upon receiving the report, processes the report and determines a proposed TSN policy update for the applications running that service (or a sub-set of them) (see block 341). The different policy types include change of service requirements and change of QoS/QoE requirements.

Examples of change of service requirements include (but are not limited to): A) Increase survival time if indication for reaching survival time was acquired or if temporary coverage gap occurs (but without affecting the service operation); B) Require the change of mobility or inter-UE distance (for this UE and the surrounding) to ensure meeting the KPIs, in cases when the congestion and/or resource unavailability at target area where the UE moves, may lead to performance downgrade; C) Increase the service area to extend TSN service coverage to ensure meeting the TSC requirements; D) Decrease the service area to minimize the effect of interference by other UEs using the same resources; and E) Request the change of automation level for the TSC service (e.g., from fully automated AGVs to cloud navigated AGVs).

Examples of change of QoS/QoE requirements include (but are not limited to): A) Change of application QoS and/or QoE requirements (e.g., throughput, RTT, reliability, communication service availability, jitter, a quality of experience score, a buffering parameter, a stalling event, a stalling ratio, a mean opinion score); and B) Change of TSN QoS profile for the service (e.g., 5QI change, alternative 5QI priority change, . . . ).

At Step 4a, the FFAE-S 323 sends the proposed TSN policy update to TSN AS 325 and/or TSN System (see messaging 343). The Update Policy Request message includes at least one of the following parameters: A) Application ID, Service ID, UE ID, and Bridge ID; B) Cause of adaptation (mobility change, QoS and/or QoE degradation, QoS and/or QoE upgrade, RAN performance downgrade/upgrade, . . . ); C) Proposed Policy Update ID; D) Proposed Policy Update type (change service req, change of QoS requirements); E) Proposed Policy Update parameters (change survival time, change mobility, change service area, change automation level, change of application QoS and/or QoE request, change of QoS profile); and F) Time validity and Area of validity for the proposed update.

At Step 4b, the FFAE-S 323 receives a response from the TSN AS 325 and/or TSN System, indicating a positive or negative acknowledgement or proposing an alternative TSN policy update (see messaging 345). The Update Policy Response message includes at least one of the following parameters: A) Result (Yes, No, Negotiate); B) Alternative Policy Update ID; C) Alternative Policy Update parameters (change survival time, change mobility, change service area, change automation level, change of application QoS/QoE request, change of QoS profile); and D) Time validity and area of validity for the negotiated update. Note that the FFAE-S 323 may also send an ACK as response for the negotiated policy update.

At Step 5a1, the FFAE-S 323 sends a service requirements update request message to the involved FFAE clients 303 (see messaging 347). This message includes the agreed policy update ID, type and parameters (proposed or alternative), as well as the time and area validity.

At Step 5a2, the FFAE-C 303 based on the update type interacts with FFAC 302 and/or TSN system to apply the requested changes (see block 349).

If the change is about survival time increase, the FFAE-C 303 sends to FFAC 302 the new extended survival time (new value or delta value).

If the change is about mobility and/or velocity change, the FFAE-C 303 sends to FFAC 302 a request for changing the mobility and/or velocity of the device. This may be also relayed to other surrounding FFAE clients 303 which are involved in this action.

If the change is about service area increase/decrease, the FFAC 302 get informed on the new coverage, and also the FFAE-C 303 notifies the AS layer of the UE 305 for adapting radio parameters accordingly, e.g., power control.

At Step 5a3, the FFAE-S 323 receives a response as acknowledgement for the update request message, upon the application of the updated policies (see messaging 351).

At Step 5b1, the FFAE-S 323 after receiving the response, acting as TSN AF, it sends an Updated TSN QoS container to SMF via PCF (via N5 or Nnef, see messaging 353). This message includes the updated QoS requirements to be applied to the PDU session. At Step 5b2, the SMF updates the PCC rules and the TSCAI which is then sent to RAN (see block 355).

Figure 4:
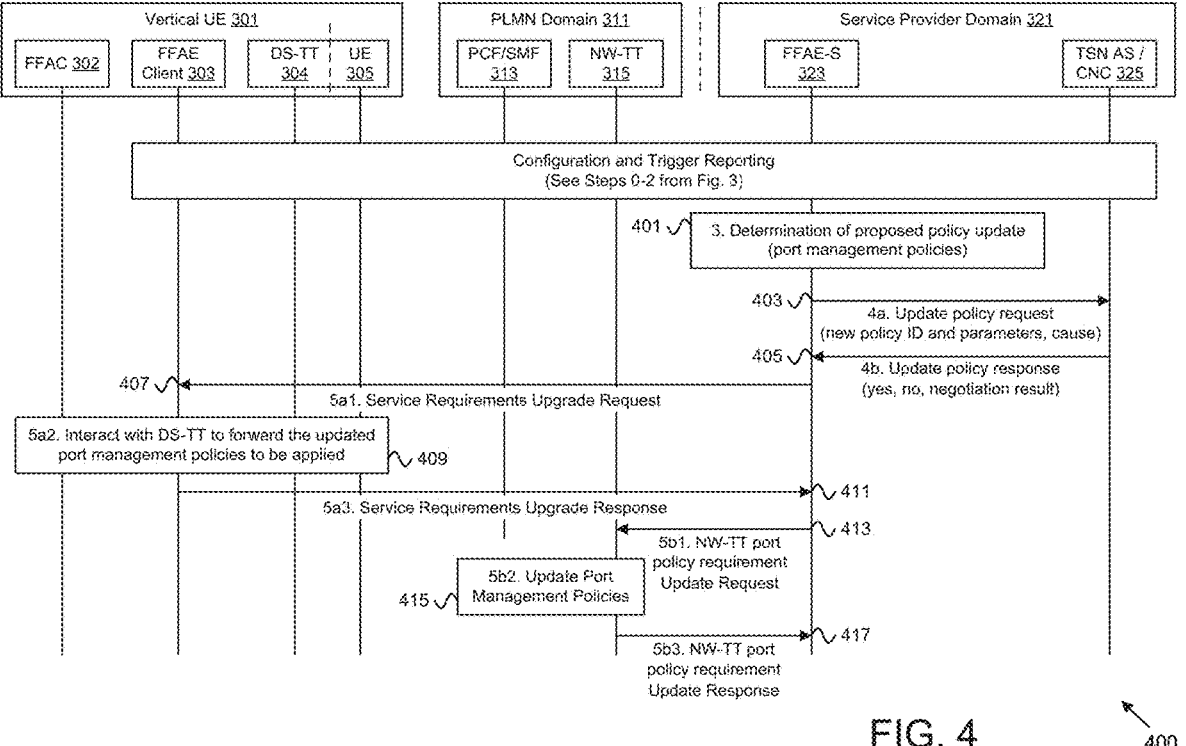
FIG. 4 is a diagram illustrating signaling flow for an operation phase for policy modification in a TSN system.

FIG. 4 depicts a procedure 400 for negotiating changes of port management policies, according to embodiments of the disclosure. The procedure 400 involves the vertical UE 301, the PLMN domain 311, and the service provider domain 321, described above with reference to FIG. 3. As a precondition, the procedure 400 assumes that the UE 305 is registered to 5GS (e.g., part of PLMN domain 311).

The procedure 400 begins with Steps 0-2 described above with reference to FIG. 3 (refer to messaging 331, block 333, messaging 335, block 337 and messaging 339).

Continuing at Step 3, the FFAE-S 323 upon receiving the report, processes the report and determines a proposed TSN policy update for the applications running that service (or a sub-set of them) (see block 401). The target is to negotiate the 5GS bridge parameters for the end-to-end TSC stream, based on the QoS/radio monitoring. The change of NW-TT 315 port management policies may include one or more of the following:

Hold-and-forward parameters (in case of high expected jitter to request the adaptation hold-and-forward time). This may include a change of parameters AdminBaseTime, AdminControlList at Port management information, e.g., described in TS 23.501, clause 5.28.3.

PSFP (e.g., change bandwidth profile)

Queuing policy parameters (change weights, priorities based on radio conditions for certain TSC streams)

Change of 5GS bridge due to high bridge delay (txPropagationDelay>threshold)

The change of DS-TT 304 port management policies may include one or more of the following:

Hold-and-forward parameters (in case of high expected jitter to request the adaptation hold-and-forward time). This may include a change of parameters AdminBaseTime, AdminControlList at Port management information, e.g., described in TS23.501, clause 5.28.3.

PSFP (e.g., change bandwidth profile)

Queuing policy parameters (change weights, priorities based on radio conditions for certain TSC streams)

Change of 5GS bridge due to high bridge delay (txPropagationDelay>threshold)

At Step 4a, the FFAE-S 323 sends the proposed TSN policy update to TSN AS 325 and/or TSN System (see messaging 403). The Update Policy Request message includes at least one of the following parameters:

Application ID, service ID, UE ID, and Bridge ID

Cause of adaptation (mobility change, QoS/QoE degradation, QoS/QoE upgrade, RAN performance downgrade/upgrade, high 5GS bridge delay, high/low jitter)

Proposed Policy Update ID

Proposed Policy Update type (NW-TT port management policy update, DS-TT port management policy update)

Proposed Policy Update parameters (Hold-and-forward parameters, PSFP parameters, Queuing policy parameters, change of 5GS bridge)

Time validity and Area of validity for the proposed update

At Step 4b, the FFAE-S 323 receives a response from the TSN AS 325 and/or TSN System, indicating a positive or negative acknowledgement or proposing an alternative TSN policy update (see messaging 405). The Update Policy Response message includes at least one of the following parameters:

Result (Yes, No, Negotiate)

Alternative Policy Update ID

Alternative Policy Update parameters (Hold-and-forward parameters, PSFP parameters, Queuing policy parameters, change of 5GS bridge)

Time validity and Area of validity for the negotiated update

Note that the FFAE-S 323 may also send an ACK as response for the negotiated policy update.

For updates to DS-TT 304 policies, the FFAE-S 323 and FFAE-C 303 perform Steps 5a. For updates to NW-TT 315 policies, the FFAE-S 323 and PLMN domain 311 perform Steps 5b.

At Step 5a1, the FFAE-S 323 sends to the FFAE-C 303 a DS-TT port management update policy request (see messaging 407), which includes the negotiated port management policies (can be seen as port management policy container which is send over FFAE layer). These parameters may include one or more of the following:

5GS bridge ID

Policy Update ID (Alternative or Proposed based on negotiation)

Alternative Policy Update parameters (Hold-and-forward parameters, PSFP parameters, Queuing policy parameters, change of 5GS bridge (new 5GS bridge parameters))

Time validity and Area of validity for the update

At Step 5a2, the FFAE-C 303 sends to DS-TT 304 the new policies of Step Sal to be applied (see block 409).

At Step 5a3, the FFAE-C 303 sends a response to the FFAE-S 323 indicating a positive or negative acknowledgement.

At Step 5b1, the FFAE-S 323 (acting as TSN AF) sends to NW-TT 315 a port management update policy request (see messaging 423), which includes the negotiated port management policies (can be seen as port management policy container which is send over FFAE layer). These parameters may include one or more of the following:

5GS bridge ID

Policy Update ID (Alternative or Proposed based on negotiation)

Alternative Policy Update parameters (Hold-and-forward parameters, PSFP parameters, Queuing policy parameters, change of 5GS bridge (new 5GS bridge parameters))

Time validity and Area of validity for the update

At Step 5b2, the NW-TT 315 updates port management policies (see block 425).

At Step 5*b*3, the NW-TT 315 sends a response to the FFAE-S 323 indicating a positive or negative acknowledgement (see messaging 427).

Figure 5:
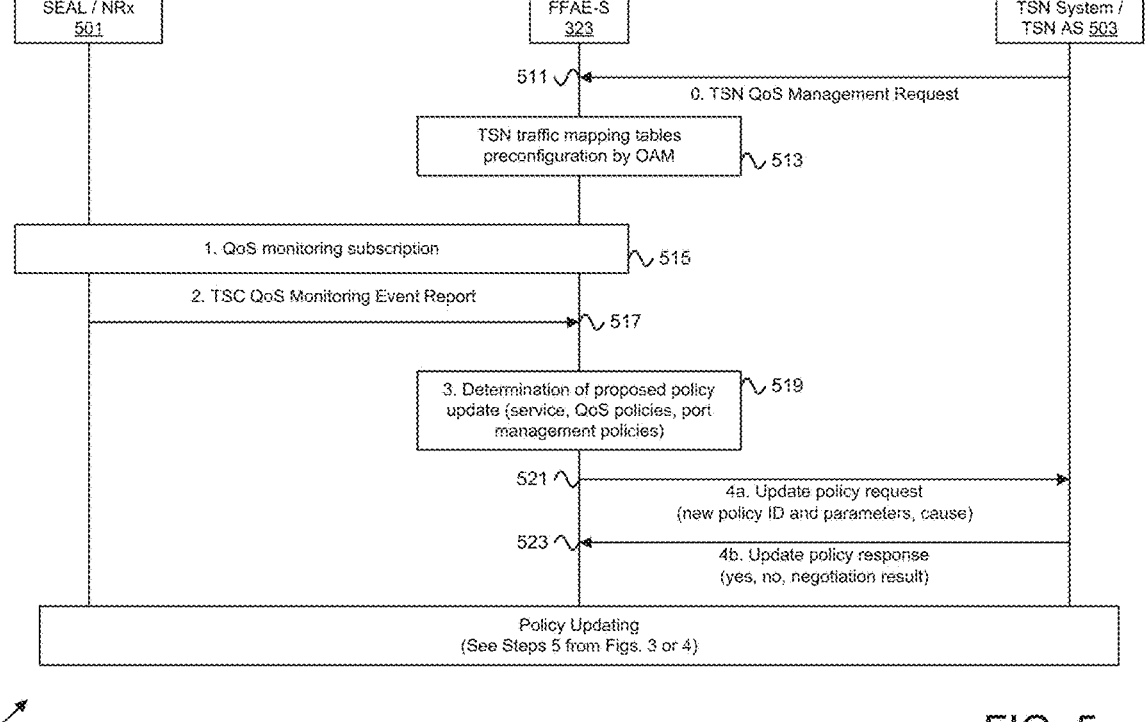
FIG. 5 is a diagram illustrating a procedure for using SEAL service for TSC QoS monitoring.

FIG. 5 depicts a procedure 500 for using SEAL service for TSC QoS monitoring, according to embodiments of the disclosure. The procedure 500 involves a SEAL server and/or NRx (depicted as combined element "SEAL/NRx" 501), a FFAE-S 323, and TSN System and/or TSN AS (depicted as combined element "TSN System/TSN AS" 503). The SEAL server is an entity which provides on-demand (subscription or request) services for all vertical enablers (e.g., FFAE-S 323). In certain embodiments, the SEAL server performs as described in 3GPP TS 23.434. A SEAL Network Resource Management service enabler specifies APIs to request reservation, modification, and release of network resources, including QoS resources.

One functionality of the SEAL/NRx 501 is the monitoring of QoS for TSC flows. In particular, the FFAE-5323 may subscribe to receive QoS monitoring reports from the SEAL server (e.g., NRx) 501 by making use of the NEF QoS monitoring capabilities. In this embodiment, the monitoring of QoS related to TSC flows is not provided by FFAE-C/device side; but this is provided by a SEAL/NRx server 501.

As a pre-condition, the UE is registered to 5GS and a TSC session is ongoing. At Step 0, TSN system (or TSN application specific server) sends to the FFAE-S 323 a request for managing the TSN QoS for one or more applications (see messaging 511). The FFAE-S 323 is defined as a middleware server which may reside at the service providers domain or the network operator domain; and includes TSN AF functionality as well as server-client support functionalities. This request includes one or more of the following parameters:

Application ID,

Service profile(s) and ID(s),

Service requirements (survival time, mobility, service coverage area),

TSN QoS-related parameters, e.g., Traffic classes and their priorities per port, TSC Burst Size of TSN streams, 5GS bridge delays per port pair and traffic class (independentDelayMax, independentDelayMin, dependentDelayMax, dependentDelayMin), Propagation delay per port, and/or UE-DS-TT residence time, PSFP policies, Enforcement flag (whether the FFAE-S 323 has the permission to enforce or just recommend a change), Maximum number of UEs to be active simultaneously, UE IDs (GPSI, external ID, group ID), and Area of validity (cell IDs, TA ID) and Time of validity.

Note that the FFAE-S 323 may also have pre-configured mapping tables from OAM (as specified in TS 23.501) (see block 513).

At Step 1, the FFAE-S 323 subscribes to receives QoS monitoring events from SEAL server/NRx 501 (see block 515). This subscription may include configuration of reporting which includes:

Application ID,

Service profiles and service IDs,

UE IDs,

TSN QoS related parameters,

TSN QoS report configuration (time, format, parameters Mandatory and Optional). This includes that certain events need to be monitored (QoS sustainability analytics, QoS attribute downgrade, QoS attribute upgrade, QoE attribute downgrade, QoE attribute upgrade), and Area of validity and Time of validity At Step 2, a trigger event is captured at the SEAL/NRx 501 which can be acquired by the SEAL client of the UE (e.g., QoE measurements, throughput degradation, packet drops, etc.) (see messaging 517). The trigger event report message is sent from the SEAL/NRx server 501 to the FFAE-S 323 and includes one or more of the following parameters:

UE QoE/QoS downgrade or upgrade indication,

UE QoE/QoS sustainability analytics,

QoS fluctuations indication, and

Radio Link failures indication.

At Step 3, the FFAE-S 323 upon receiving the report, processes the report and determines a proposed TSN policy update for the applications running that service (or a sub-set of them) (see block 519). The target is to negotiate the service, QoS or port management information with the TSN system 503 (parameters are similar to Steps 3 of Embodiments #1 and #2).

At Step 4*a*, the FFAE-S 323 sends the proposed TSN policy update to TSN AS/TSN System 503 (see messaging 521). The Update Policy Request message includes at least one of the following parameters:

Application ID, Service ID, UE ID, Bridge ID

Cause of adaptation (mobility change, QoS/QoE degradation, QoS/QoE upgrade, RAN performance downgrade/upgrade, high 5GS bridge delay, high/low jitter), Proposed Policy Update ID, Proposed Policy Update type (service adaptation request, QoS adaptation request, NW-TT port management policy update, DS-TT port management policy update), Proposed Policy Update parameters (change survival time, change mobility, change service area, change automation level, change of application QoS/QoE request, change of QoS profile, Hold-and-forward parameters, PSFP parameters, Queuing policy parameters, change of 5GS bridge), and Time validity and Area of validity for the proposed update.

At Step 4*b*, the FFAE-S 323 receives a response from the TSN AS/TSN System 503, indicating a positive or negative acknowledgement or proposing an alternative TSN policy update (see messaging 523). The Update Policy Response message includes at least one of the following parameters:

Result (Yes, No, Negotiate),

Alternative Policy Update ID,

Alternative Policy Update parameters (change survival time, change mobility, change service area, change automation level, change of app QoS/QoE req., change of QoS profile, Hold-and-forward parameters, PSFP parameters, Queuing policy parameters, change of 5GS bridge), and Time validity and Area of validity for the negotiated update.

Note that the FFAE-S 323 may also send an ACK as response for the negotiated policy update.

At Step 5, the SEAL/NRx 501, a FFAE-S 323, and TSN System/TSN AS 503 perform policy updating (see block 525). If the policies require service/QoS adaptation, the transmission of the update policies to FFAE-C, DS-TT, NW-TT is similar to Step 5 of the FIG. 3 (the first solution). If the policies alter port management parameters policies require service/QoS adaptation, the transmission of the update policies to FFAE-C, DS-TT, NW-TT is similar to Step 5 of the FIG. 4 (the second solution).

Figure 6:
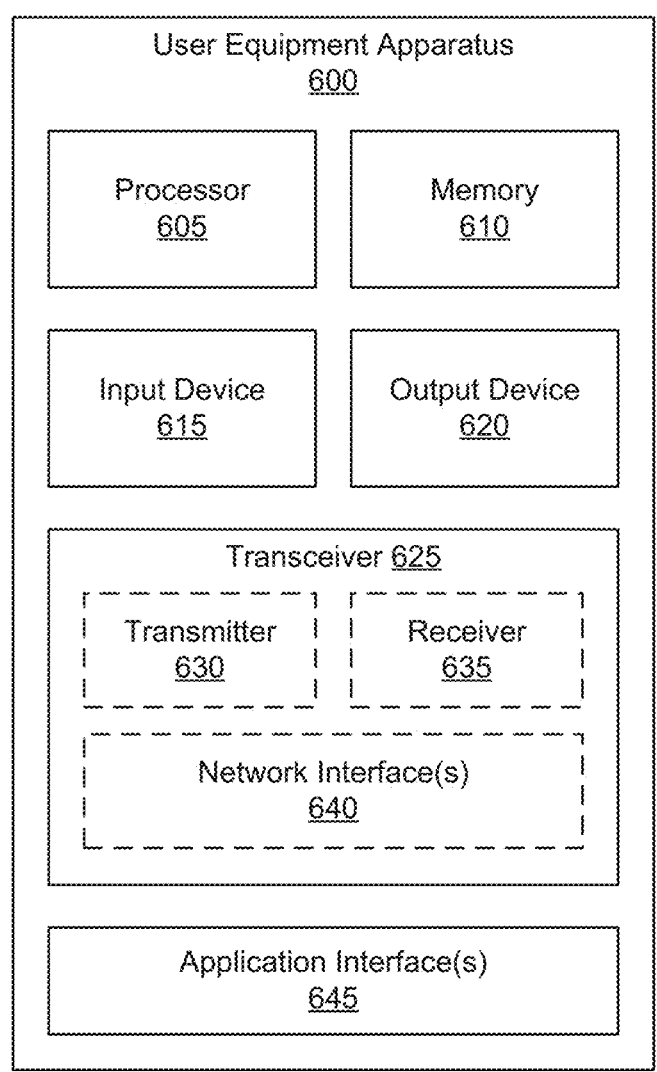
FIG. 6 is a diagram illustrating one embodiment of a user equipment apparatus that may be used for policy modification in a TSN system.

FIG. 6 depicts a user equipment apparatus 600 that may be used for policy modification in a TSN system, according to embodiments of the disclosure. In various embodiments, the user equipment apparatus 600 is used to implement one or more of the solutions described above. The user equipment apparatus 600 may be implemented in a TSN device, such as the TSN device 103 containing the remote unit 105 and FFAE-C 109, and/or the vertical UE 301 containing FFAE-C 303 and UE 305, described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640. In some embodiments, the transceiver 625 supports a first interface (e.g., Uu interface) for communicating with one or more base units in a RAN, a second interface (e.g., N1 interface) for communicating with a AMF, and a third interface for communicating with a TSN system.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

The user equipment apparatus 600 supports one or more application interfaces 645. Each application interface 645 supports communication among application instances running on the user equipment apparatus 600 and/or supports communication with an external application instance, e.g., running on a network device or a UE. In some embodiments, the application interface(s) 645 include a set of functions and procedures that allow for applications running on the user equipment apparatus 600 to access data and features of other applications, services or operating systems. As described in further detail below, a FFAE client running on the user equipment apparatus 600 may use an application interface 645 to communicate with a FFAE server. As another example, a TSN application running on the user equipment apparatus 600 may use an application interface 645 to communicate with a TSN application server.

In various embodiments, the processor 605 controls the user equipment apparatus 600 to implement the above described UE and/or FFAE-C behaviors. In some embodiments, the processor 605 detects a trigger event. Here, the trigger event may indicate a change to at least one of: a wireless radio parameter, a UE QoS parameter, and UE context information. Via the transceiver 625 and/or application interface 645, the processor 605 reports the trigger event to an application enabler server (i.e., the FFAE-S) and receives a policy parameter based on the first policy parameter from the TSN system. Here, the policy parameter includes at least one of: a first service parameter, a first QoS parameter and a first port management parameter. The processor 605 updates a TSN policy based on the received policy parameter.

In some embodiments, the policy parameter is received in an update request. In such embodiments, the processor 605 further transmits (i.e., via transceiver 625) an update response to the application enabler server.

In some embodiments, the processor 605 receives (i.e., via transceiver 625 and/or application interface 645) a request for monitoring reporting from the application enabler server. In such embodiments, the trigger event is reported in response to the request for monitoring reporting. In certain embodiments, the request for monitoring reporting includes a subscription request for a Subscribe/Notify communication model. In other embodiments, the request for monitoring reporting includes a subscription request for a Request/Response communication model.

In various embodiments, the request for monitoring reporting includes at least one of the following parameters: an Application ID, at least one service profile and service ID, at least one UE ID, at least one TSN QoS related parameter, a TSN QoS report configuration, a set of area of validity and time of validity parameters.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to policy modification in a TSN system. For example, the memory 610 may store TSN policies, service requirements, QoS requirements, QoE requirements, port management policies, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

In various embodiments, the transceiver 625 is configured to communicate with 3GPP access network(s) and/or the non-3GPP access network(s). In some embodiments, the transceiver 625 implements modem functionality for the 3GPP access network(s) and/or the non-3GPP access network(s). In one embodiment, the transceiver 625 implements multiple logical transceivers using different communication protocols or protocol stacks, while using common physical hardware.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

The transceiver 625 may include one or more transmitters 630 and one or more receivers 635. Although a specific number of transmitters 630 and receivers 635 are illustrated, the user equipment apparatus 600 may have any suitable number of transmitters 630 and receivers 635. Further, the transmitter(s) 630 and the receiver(s) 635 may be any suitable type of transmitters and receivers. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module. In certain embodiments, the transceiver 625 may implement a 3GPP modem (e.g., for communicating via NR or LTE access networks) and a non-3GPP modem (e.g., for communicating via Wi-Fi or other non-3GPP access networks).

Figure 7:
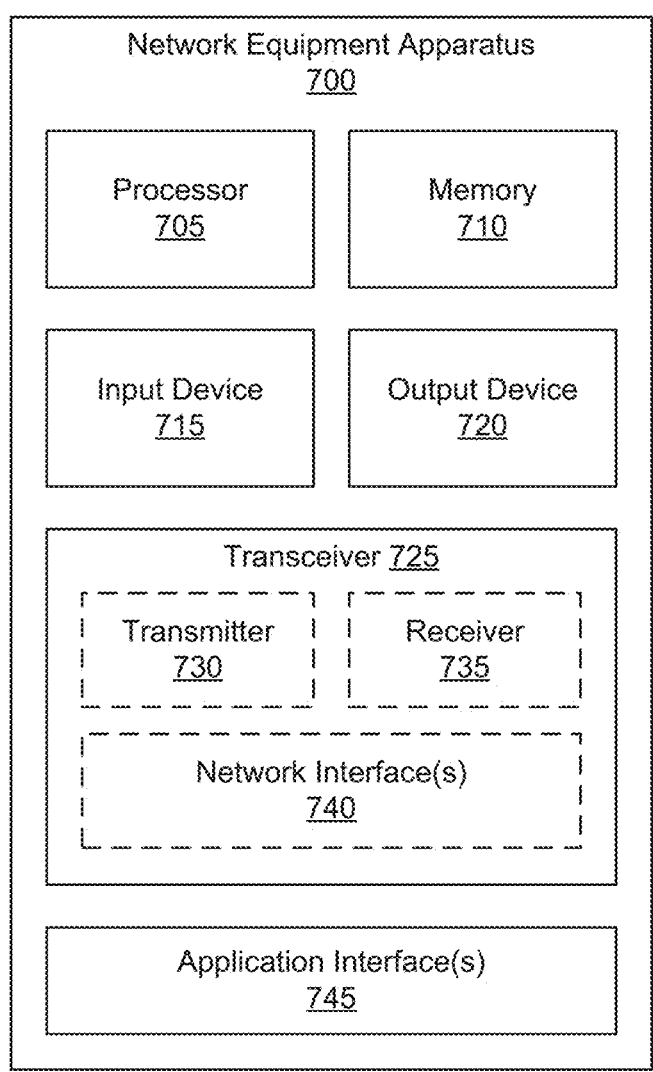
FIG. 7 is a diagram illustrating one embodiment of a network equipment apparatus that may be used for policy modification in a TSN system.

FIG. 7 depicts one embodiment of a network equipment apparatus 700 that may be used for policy modification in a TSN system, according to embodiments of the disclosure. In some embodiments, the network equipment apparatus 700 may be one embodiment of a FFAE server, such as the FFAE-S 151, and/or the FFAE 323. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740, such as the N1, N2, and N3 interfaces. In some embodiments, the transceiver 725 supports a first interface for communicating with one or more network functions in a mobile core network (e.g., a 5GC and/or EPC), a second interface for communicating with a TSN system, and a third interface for communicating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

The network equipment apparatus 700 supports one or more application interfaces 745. Each application interface 745 supports communication among application instances running on the user equipment apparatus 700 and/or supports communication with an external application instance, e.g., running on a network device or a UE. In some embodiments, the application interface(s) 745 include a set of functions and procedures that allow for applications running on the network equipment apparatus 700 to access data and features of other applications, services or operating systems. As described in further detail below, a FFAE client running on the network equipment apparatus 700 may use an application interface 745 to communicate with a FFAE server. As another example, a TSN application running on the network equipment apparatus 700 may use an application interface 745 to communicate with a TSN application server.

In various embodiments, the processor 705 controls the network equipment apparatus 700 to perform the above described FFAE-S behaviors. Via an application interface 745, the processor 705 may receive a trigger event. Here, the trigger event indicates a change to at least one of: a wireless radio parameter, a UE QoS parameter, and UE context information. Responsive to the trigger event, the processor 705 determines a first policy parameter for at least one UE. Here, the first policy parameter includes at least one of: a first service parameter, a first QoS parameter and a first port management parameter.

Via the network interface 740 and/or application interface 745, the processor 705 requests a policy modification from a TSN system, said request including the first policy parameter, and receives a second policy parameter based on the first policy parameter from the TSN system. Via the network interface 740 and/or application interface 745, the processor 705 transmits the second policy parameter to at least one network entity and/or the at least one UE.

In some embodiments, the processor 705 sends a request for monitoring reporting from the at least one UE. In certain embodiments, the request for monitoring reporting comprises a subscription request for a Subscribe/Notify communication model. In other embodiments, the request for monitoring reporting includes a subscription request for a Request/Response communication model. In various embodiments, the request for monitoring reporting includes at least one of the following parameters: an Application ID, at least one service profile and service ID, at least one UE ID, at least one TSN QoS related parameter, a TSN QoS report configuration, a set of area of validity and time of validity parameters.

In some embodiments, the trigger event is one of the following: a downgrade indication for UE QoS, a downgrade indication for UE QoE, UE QoS sustainability analytics, UE QoE sustainability analytics, a high resource load indication, a congestion indication, a high access-delay indication, a low resource availability indication, a QoS fluctuation indication, a radio link failure indication, a channel loss over a threshold amount, a packet error rate over a threshold amount, a UE mobility indication, a UE velocity change indication, RRM measurements, RLM measurements, an indication for reaching maximum survival time, and an indication for reaching service area edge.

In some embodiments, the first policy parameter is a service parameter or a first QoS parameter, wherein the first policy parameter comprises one or more of the following actions: an increased survival time, a decreased survival time, a change of UE mobility distance, a change of inter-UE distance, an increase of a TSC service area, a decrease of the TSC service area, an adaption to an automation level for a TSC flow, an adaption to an application QoS requirement, an adaption to a network QoS requirement, an adaption to a network QoS profile, and an adaption to a QoE target.

In some embodiments, the first policy parameter is port management parameter, wherein the first policy parameter comprises one or more of the following actions: an adaption to a Hold-and-Forward parameter (in particular change of AdminBaseTime, AdminControlList), an adaption to a Per Stream Flow Policy (e.g., change bandwidth profile), an adaption to a Queuing policy parameter (change weights, priorities), and a 5GS bridge switch.

In some embodiments, the second updated policy parameter is different from the first parameter. In certain embodiments, the second policy parameter comprises one or more of the following actions: an increased survival time, a decreased survival time, a change of UE mobility distance, a change of inter-UE distance, an increase to a TSC service area, a decrease the TSC service area, an adaption to an automation level for the TSC flow, an adaption to an application QoS requirement, an adaption to a network QoS requirement, an adaption to a network QoS profile, an adaption to a QoE target, an adaption to a Hold-and-Forward parameters (in particular change of AdminBaseTime, AdminControlList), an adaption to a Per Stream Flow Policies (e.g., change bandwidth profile), an adaption to a Queuing policy parameters (change weights, priorities), and a 5GS bridge switch.

In some embodiments, the determination of the second policy parameter is determined by a TSN system or an external application. In certain embodiments, the at least one network entity to which the second policy parameter is transmitted comprises a NW-TT and/or a core network function. In certain embodiments, the second policy parameter is transmitted to a DS-TT and/or one or more applications of the at least one UE. In some embodiments, the trigger event is received from at least one of a SEAL server and a network resource management server.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to policy modification in a TSN system, for example storing TSN policies, service requirements, QoS requirements, QoE requirements, port management policies, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more network functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

Figure 8:
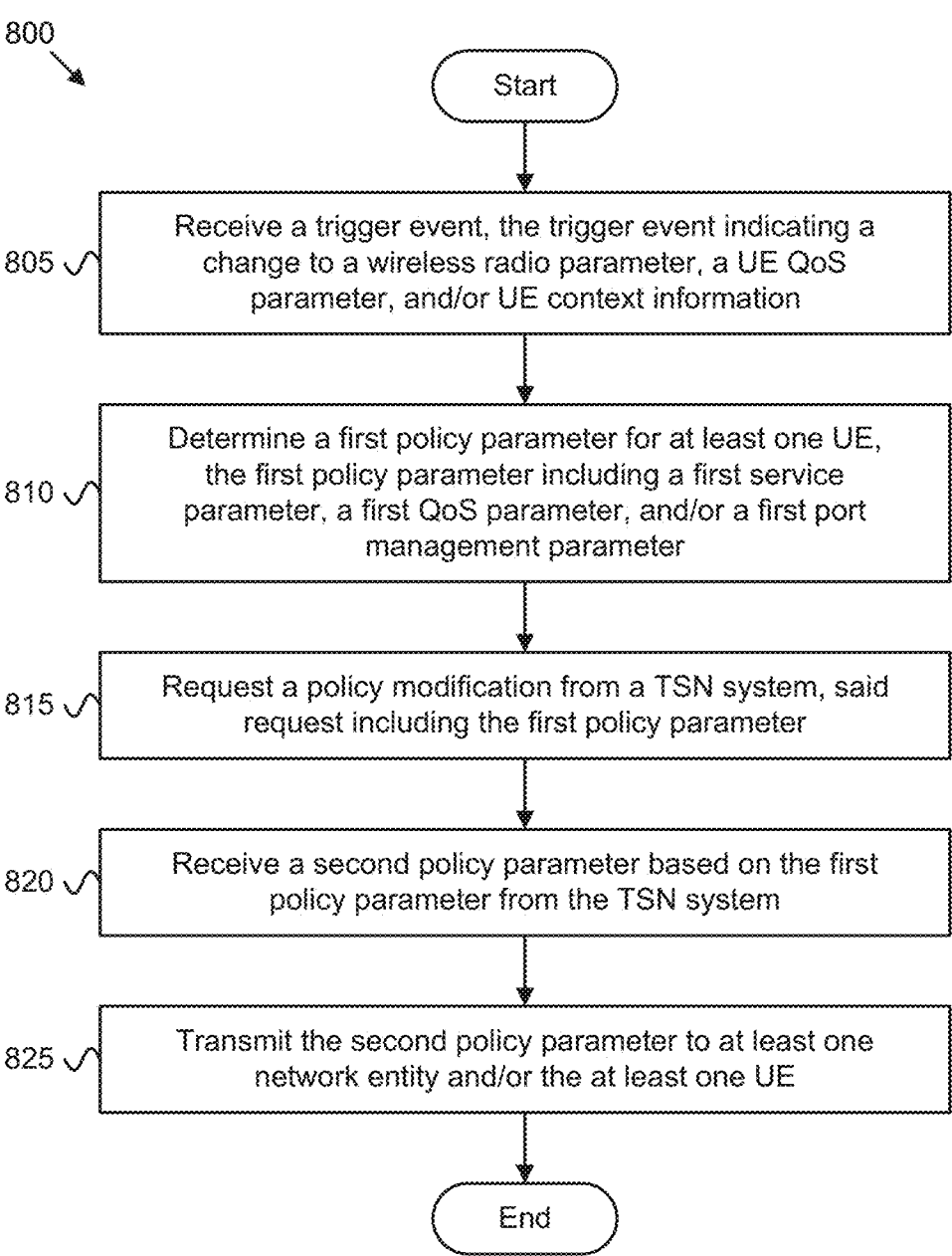
FIG. 8 is a flowchart diagram illustrating one embodiment of a method that may be used for policy modification in a TSN system.

FIG. 8 depicts one embodiment of a method 800 for policy modification in a TSN system, according to embodiments of the disclosure. In various embodiments, the method 800 is performed by a FFAE server, such as the FFAE-S 151, the FFAE 323, and/or the network equipment apparatus 700, described above. In some embodiments, the method 800 is performed by a processor, such as a microcontroller, a microprocessor, a CPU, a GPU, an auxiliary processing unit, a FPGA, or the like.

The method 800 begins and receives 805 a trigger event, the trigger event indicating a change to a wireless radio parameter, a UE QoS parameter, and/or UE context information. The method 800 includes determining 810 a first policy parameter for at least one UE. Here, the first policy parameter includes a first service parameter, a first QoS parameter, and/or a first port management parameter. The method 800 includes requesting 815 a policy modification from a TSN system, said request including the first policy parameter. The method 800 includes receiving 820 a second policy parameter based on the first policy parameter from the TSN system. The method 800 includes transmitting 825 the second policy parameter to at least one network entity and/or the at least one UE. The method 800 ends.

FIG. 9 depicts one embodiment of a method 900 for policy modification in a TSN system, according to embodiments of the disclosure. In various embodiments, the method

900 is performed by a FFAE client device, such as the FFAE-C 109 in the TSN device 103, the FFAE-C 303 in the vertical UE 301, and/or the user equipment apparatus 600, described above. In some embodiments, the method 900 is performed by a processor, such as a microcontroller, a microprocessor, a CPU, a GPU, an auxiliary processing unit, a FPGA, or the like.

The method 900 begins and detects 905 a trigger event, the trigger event indicating a change to a wireless radio parameter, a UE QoS parameter, and/or UE context information. The method 900 includes reporting 910 the trigger event to an application enabler server. The method 900 includes receiving 915 a policy parameter based on the first policy parameter from the TSN system, the policy parameter includes a first service parameter, a first QoS parameter and/or a first port management parameter. The method 900 includes updating 920 a TSN policy based on the received policy parameter. The method 900 ends.

Disclosed herein is a first apparatus for negotiating the TSN QoS, service and bridge parameters for one or more TSC flows of one or more UEs, according to embodiments of the disclosure. The first apparatus may be implemented by a FFAE server, such as the FFAE-S 151, the FFAE 323, and/or user equipment apparatus 700. The first apparatus includes a processor and an application interface that receives a trigger event, the trigger event indicating a change to at least one of: a wireless radio parameter, a UE QoS parameter, and UE context information. The processor determines a first policy parameter for at least one UE. Here, the first policy parameter includes at least one of: a first service parameter, a first QoS parameter and a first port management parameter. Via the application interface, the processor requests a policy modification from a TSN system, said request including the first policy parameter, receives a second policy parameter based on the first policy parameter from the TSN system, and transmits the second policy parameter to at least one network entity and/or the at least one UE.

In some embodiments, the processor sends a request for monitoring reporting from the at least one UE. In certain embodiments, the request for monitoring reporting comprises a subscription request for a Subscribe/Notify communication model. In other embodiments, the request for monitoring reporting includes a subscription request for a Request/Response communication model. In various embodiments, the request for monitoring reporting includes at least one of the following parameters: an Application ID, at least one service profile and service ID, at least one UE ID, at least one TSN QoS related parameter, a TSN QoS report configuration, a set of area of validity and time of validity parameters.

In some embodiments, the trigger event is one of the following: a downgrade indication for UE QoS, a downgrade indication for UE QoE, UE QoS sustainability analytics, UE QoE sustainability analytics, a high resource load indication, a congestion indication, a high access-delay indication, a low resource availability indication, a QoS fluctuation indication, a radio link failure indication, a channel loss over a threshold amount, a packet error rate over a threshold amount, a UE mobility indication, a UE velocity change indication, RRM measurements, RLM measurements, an indication for reaching maximum survival time, and an indication for reaching service area edge.

In some embodiments, the first policy parameter is a service parameter or a first QoS parameter, wherein the first policy parameter comprises one or more of the following actions: an increased survival time, a decreased survival time, a change of UE mobility distance, a change of inter-UE distance, an increase of a TSC service area, a decrease of the TSC service area, an adaption to an automation level for a TSC flow, an adaption to an application QoS requirement, an adaption to a network QoS requirement, an adaption to a network QoS profile, and an adaption to a QoE target.

In some embodiments, the first policy parameter is port management parameter, wherein the first policy parameter comprises one or more of the following actions: an adaption to a Hold-and-Forward parameter (in particular change of AdminBaseTime, AdminControlList), an adaption to a Per Stream Flow Policy (e.g., change bandwidth profile), an adaption to a Queuing policy parameter (change weights, priorities), and a 5GS bridge switch.

In some embodiments, the second updated policy parameter is different from the first parameter. In certain embodiments, the second policy parameter comprises one or more of the following actions: an increased survival time, a decreased survival time, a change of UE mobility distance, a change of inter-UE distance, an increase to a TSC service area, a decrease the TSC service area, an adaption to an automation level for the TSC flow, an adaption to an application QoS requirement, an adaption to a network QoS requirement, an adaption to a network QoS profile, an adaption to a QoE target, an adaption to a Hold-and-Forward parameters (in particular change of AdminBaseTime, AdminControlList), an adaption to a Per Stream Flow Policies (e.g., change bandwidth profile), an adaption to a Queuing policy parameters (change weights, priorities), and a 5GS bridge switch.

In some embodiments, the determination of the second policy parameter is determined by a TSN system or an external application. In certain embodiments, the at least one network entity to which the second policy parameter is transmitted comprises a NW-TT and/or a core network function. In certain embodiments, the second policy parameter is transmitted to a DS-TT and/or one or more applications of the at least one UE. In some embodiments, the trigger event is received from at least one of a SEAL server and a network resource management server.

Disclosed herein is a first method for negotiating the TSN QoS, service and bridge parameters for one or more TSC flows of one or more UEs, according to embodiments of the disclosure. The first method may be performed by a FFAE server, such as the FFAE-S 151, the FFAE 323, and/or user equipment apparatus 700. The first method includes receiving a trigger event. Here, the trigger event indicating a change to at least one of: a wireless radio parameter, a UE QoS parameter, and UE context information. The first method determining a first policy parameter for at least one UE. Here, the first policy parameter includes at least one of: a first service parameter, a first QoS parameter and a first port management parameter. The first method requesting a policy modification from a TSN system, said request including the first policy parameter, receiving a second policy parameter based on the first policy parameter from the TSN system, and transmitting the second policy parameter to at least one network entity and/or the at least one UE.

In some embodiments, the first method includes requesting monitoring reporting from the at least one UE. In certain embodiments, the request for monitoring reporting includes a subscription request for a Subscribe/Notify communication model. In other embodiments, the request for monitoring reporting includes a subscription request for a Request/Response communication model. In various embodiments, the request for monitoring reporting includes at least one of the following parameters: an Application ID, at least one service profile and service ID, at least one UE ID, at least one TSN QoS related parameter, a TSN QoS report configuration, a set of area of validity and time of validity parameters.

In some embodiments, the trigger event is one of the following: a downgrade indication for UE QoS, a downgrade indication for UE QoE, UE QoS sustainability analytics, UE QoE sustainability analytics, a high resource load indication, a congestion indication, a high access-delay indication, a low resource availability indication, a QoS fluctuation indication, a radio link failure indication, a channel loss over a threshold amount, a packet error rate over a threshold amount, a UE mobility indication, a UE velocity change indication, RRM measurements, RLM measurements, an indication for reaching maximum survival time, and an indication for reaching service area edge.

In some embodiments, the first policy parameter is a service parameter or a first QoS parameter, wherein the first policy parameter comprises one or more of the following actions: an increased survival time, a decreased survival time, a change of UE mobility distance, a change of inter-UE distance, an increase of a TSC service area, a decrease of the TSC service area, an adaption to an automation level for a TSC flow, an adaption to an application QoS requirement, an adaption to a network QoS requirement, an adaption to a network QoS profile, and an adaption to a QoE target.

In some embodiments, the first policy parameter is port management parameter, wherein the first policy parameter comprises one or more of the following actions: an adaption to a Hold-and-Forward parameter (in particular change of AdminBaseTime, AdminControlList), an adaption to a Per Stream Flow Policy (e.g., change bandwidth profile), an adaption to a Queuing policy parameter (change weights, priorities), and a 5GS bridge switch.

In some embodiments, the second updated policy parameter is different from the first parameter. In certain embodiments, the second policy parameter comprises one or more of the following actions: an increased survival time, a decreased survival time, a change of UE mobility distance, a change of inter-UE distance, an increase to a TSC service area, a decrease the TSC service area, an adaption to an automation level for the TSC flow, an adaption to an application QoS requirement, an adaption to a network QoS requirement, an adaption to a network QoS profile, an adaption to a QoE target, an adaption to a Hold-and-Forward parameters (in particular change of AdminBaseTime, AdminControlList), an adaption to a Per Stream Flow Policies (e.g., change bandwidth profile), an adaption to a Queuing policy parameters (change weights, priorities), and a 5GS bridge switch.

In some embodiments, the determination of the second policy parameter is determined by a TSN system or an external application. In certain embodiments, the at least one network entity to which the second policy parameter is transmitted comprises a NW-TT and/or a core network function. In certain embodiments, the second policy parameter is transmitted to a DS-TT and/or one or more applications of the at least one UE. In some embodiments, the trigger event is received from at least one of a SEAL server and a network resource management server.

Disclosed herein is a second apparatus for negotiating the TSN QoS, service and bridge parameters for one or more TSC flows of one or more UEs, according to embodiments of the disclosure. The second apparatus may be implemented by a FFAE client device, such as the FFAE-C 109 in the TSN device 103, the FFAE-C 303 in the vertical UE 301, and/or the user equipment apparatus 600, described above. The second apparatus includes a processor that detects a trigger event, the trigger event indicating a change to at least one of: a wireless radio parameter, a UE QoS parameter, and UE context information. The second apparatus includes a transceiver that reports the trigger event to an application enabler server (i.e., the FFAE-S) and receives a policy parameter based on the first policy parameter from the TSN system. Here, the policy parameter includes at least one of: a first service parameter, a first QoS parameter and a first port management parameter. The processor updates a TSN policy based on the received policy parameter.

In some embodiments, the policy parameter is received in an update request. In such embodiments, the processor further transmits an update response to the application enabler server.

In some embodiments, the transceiver receives a request for monitoring reporting from the application enabler server, wherein the trigger event is reported in response to the request for monitoring reporting. In certain embodiments, the request for monitoring reporting includes a subscription request for a Subscribe/Notify communication model. In other embodiments, the request for monitoring reporting includes a subscription request for a Request/Response communication model. In various embodiments, the request for monitoring reporting includes at least one of the following parameters: an Application ID, at least one service profile and service ID, at least one UE ID, at least one TSN QoS related parameter, a TSN QoS report configuration, a set of area of validity and time of validity parameters.

Disclosed herein is a second method for negotiating the TSN QoS, service and bridge parameters for one or more TSC flows of one or more UEs, according to embodiments of the disclosure. The second method may be implemented by a FFAE client device, such as the FFAE-C 109 in the TSN device 103, the FFAE-C 303 in the vertical UE 301, and/or the user equipment apparatus 600, described above. The second method includes detecting a trigger event. Here, the trigger event indicates a change to at least one of: a wireless radio parameter, a UE QoS parameter, and UE context information. The second method includes reporting the trigger event to an application enabler server (i.e., the FFAE-S) and receiving a policy parameter based on the first policy parameter from the TSN system. Here, the policy parameter includes at least one of: a first service parameter, a first QoS parameter and a first port management parameter. The second method includes updating a TSN policy based on the received policy parameter.

In some embodiments, the policy parameter is received in an update request. In such embodiments, the second method includes transmitting an update response to the application enabler server.

In some embodiments, the second method includes receiving a request for monitoring reporting from the application enabler server, wherein the trigger event is reported in response to the request for monitoring reporting. In certain embodiments, the request for monitoring reporting comprises a subscription request for a Subscribe/Notify communication model. In other embodiments, the request for monitoring reporting comprises a subscription request for a Request/Response communication model. In various embodiments, the request for monitoring reporting includes at least one of the following parameters: an Application ID, at least one service profile and service ID, at least one UE ID, at least one TSN QoS related parameter, a TSN QoS report configuration, a set of area of validity and time of validity parameters.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a memory; and
   a processor coupled to the memory, the processor configured to cause the apparatus to:
   receive a trigger event from a user equipment (UE), the trigger event indicating a change to one or more of: a wireless radio parameter, a UE Quality of Service (QoS) parameter, or UE context information;
   determine a first policy parameter for at least one UE, the first policy parameter comprising:
   a first service parameter,
   a first QoS parameter,
   a first port management parameter,
   or a combination thereof;
   transmit a request for a policy modification from a Time-Sensitive Networking (TSN) system, the request including the first policy parameter;
   receive a second policy parameter based on the first policy parameter from the TSN system; and
   transmit the second policy parameter to at least one network entity and/or or the at least one UE.

2. The apparatus of claim 1, wherein the processor is configured to cause the apparatus to transmit a request for monitoring reporting from the at least one UE.

3. The apparatus of claim 2, wherein the request for monitoring reporting includes one or more of:
   an Application ID,
   at least one service profile and service ID,
   at least one UE ID,
   at least one TSN QoS related parameter,
   a TSN QoS report configuration,
   a set of area of validity parameters,
   a set of time of validity parameters,
   or a combination thereof.

4. The apparatus of claim 1, wherein the trigger event comprises:
   a downgrade indication for UE QoS,
   a downgrade indication for UE Quality of Experience (QoE),
   UE QoS sustainability analytics,
   UE QoE sustainability analytics,
   a high resource load indication,
   a congestion indication,
   a high access-delay indication,
   a low resource availability indication,
   a QoS fluctuation indication,
   a radio link failure indication,
   a channel loss over a threshold amount,
   a packet error rate over a threshold amount,
   a UE mobility indication,
   a UE velocity change indication,
   a set of Radio Resource Management measurements,
   a set of Radio Link Management measurements,
   an indication for reaching maximum survival time,
   an indication for reaching service area edge,
   or a combination thereof.

33

5. The apparatus of claim 1, wherein the first policy parameter is the first service parameter or the first QoS parameter, wherein the first policy parameter comprises one or more of:

an increased survival time,
a decreased survival time,
a change of UE mobility distance,
a change of inter-UE distance,
an increase of a Time-Sensitive Communication (TSC) service area,
a decrease of the TSC service area,
an adaption to an automation level for a TSC flow,
an adaption to an application QoS requirement,
an adaption to a network QoS requirement,
an adaption to a network QoS profile,
an adaption to a Quality of Experience (QoE) target,
or a combination thereof.

6. The apparatus of claim 1, wherein the first policy parameter is the first port management parameter, wherein the first policy parameter comprises one or more of:

an adaption to a Hold-and-Forward parameter,
an adaption to a Per Stream Flow Policy,
an adaption to a Queuing policy parameter,
a 5GS bridge switch,
or a combination thereof.

7. The apparatus of claim 1, wherein the second policy parameter is different from the first policy parameter, wherein the second policy parameter comprises one or more of:

an increased survival time,
a decreased survival time,
a change of UE mobility distance, a change of inter-UE distance,
an increase to a Time-Sensitive Communication (TSC) service area,
a decrease the TSC service area,
an adaption to an automation level for a TSC flow,
an adaption to an application QoS requirement,
an adaption to a network QoS requirement,
an adaption to a network QoS profile,
an adaption to a Quality of Experience (QoE) target,
an adaption to a Hold-and-Forward parameters,
an adaption to a Per Stream Flow Policies,
an adaption to a Queuing policy parameters,
a 5GS bridge switch,
or a combination thereof.

8. The apparatus of claim 1, wherein the second policy parameter is determined by the TSN system or an external application.

9. The apparatus of claim 1, wherein the at least one network entity to which the second policy parameter is transmitted comprises a Network-Side TSN Translator and/or a core network function.

10. The apparatus of claim 1, wherein the apparatus transmits the second policy parameter to a Device-Side TSN Translator and/or to one or more applications of the at least one UE.

11. The apparatus of claim 1, wherein the trigger event is received from:

a Service Enabler Architecture Layer (SEAL) server,
a network resource management server,
or a combination thereof.

12. A method performed by an application enabler server, the method comprising:

receiving a trigger event from a user equipment (UE), the trigger event indicating a change to one or more of: a wireless radio parameter, a UE Quality of Service (QoS) parameter, or UE context information;
determining a first policy parameter for at least one UE, the first policy parameter comprising:

a first service parameter,
a first QoS parameter,
a first port management parameter,
or a combination thereof;

transmitting a request for a policy modification from a Time-Sensitive Networking (TSN) system, the request including the first policy parameter;
receiving a second policy parameter based on the first policy parameter from the TSN system; and
transmitting the second policy parameter to at least one network entity or the at least one UE.

13. The method of claim 12, wherein the second policy parameter is different from the first policy parameter, wherein the second policy parameter comprises one or more of:

an increased survival time,
a decreased survival time,
a change of UE mobility distance,
a change of inter-UE distance,
an increase to a Time-Sensitive Communication (TSC) service area,
a decrease the TSC service area,
an adaption to an automation level for a TSC flow,
an adaption to an application QoS requirement,
an adaption to a network QoS requirement,
an adaption to a network QoS profile,
an adaption to a Quality of Experience (QoE) target,
an adaption to a Hold-and-Forward parameters,
an adaption to a Per Stream Flow Policies,
an adaption to a Queuing policy parameters,
a 5GS bridge switch,
or a combination thereof.

14. The method of claim 12, wherein the first policy parameter is the first port management parameter, wherein the first policy parameter comprises one or more of:

an adaption to a Hold-and-Forward parameter,
an adaption to a Per Stream Flow Policy,
an adaption to a Queuing policy parameter,
a 5GS bridge switch,
or a combination thereof.

15. The method of claim 12, wherein the trigger event is received from:

a Service Enabler Architecture Layer (SEAL) server,
a network resource management server,
or a combination thereof.

16. A user equipment (UE) for wireless communication, comprising:

a memory; and
a processor coupled to the memory, the processor configured to cause the UE to:
detect, by the UE, a trigger event indicating a change to:
a wireless radio parameter,
a user equipment (UE) Quality of Service (QoS) parameter,
UE context information,
or a combination thereof;
report the trigger event to an application enabler server;
receive a policy parameter from a Time-Sensitive Networking (TSN) system, the policy parameter comprising one or more of:
a first service parameter,
a first QoS parameter,
a first port management parameter,
or a combination thereof; and
update a TSN policy based on the policy parameter.

17. The UE of claim 16, wherein the policy parameter is received in an update request, wherein the processor is configured to cause the UE to transmit an update response to the application enabler server.

18. The UE of claim 16, wherein the processor is configured to cause the UE to receive a request for monitoring reporting from the application enabler server, and to report the trigger event in response to the request for monitoring reporting.

19. The UE of claim 18, wherein the request for monitoring reporting includes one or more of:

an Application ID, at least one service profile and service ID, at least one UE ID, at least one TSN QoS related parameter, a TSN QoS report configuration, a set of area of validity parameters, a set of time of validity parameters, or a combination thereof.

20. The UE of claim 18, wherein the request for monitoring reporting comprises a subscription request.

\* \* \* \* \*